Nov. 6, 1951 G. E. MALLINCKRODT 2,573,800
MACHINE TOOL
Filed Jan. 17, 1948 4 Sheets-Sheet 1

George E. Mallinckrodt,
Inventor.
Haynes and Koenig,
Attorneys.

Nov. 6, 1951 — G. E. MALLINCKRODT — 2,573,800
MACHINE TOOL
Filed Jan. 17, 1948 — 4 Sheets-Sheet 2

George E. Mallinckrodt, Inventor
Haynes and Koenig, Attorneys

Nov. 6, 1951   G. E. MALLINCKRODT   2,573,800
MACHINE TOOL
Filed Jan. 17, 1948   4 Sheets-Sheet 3
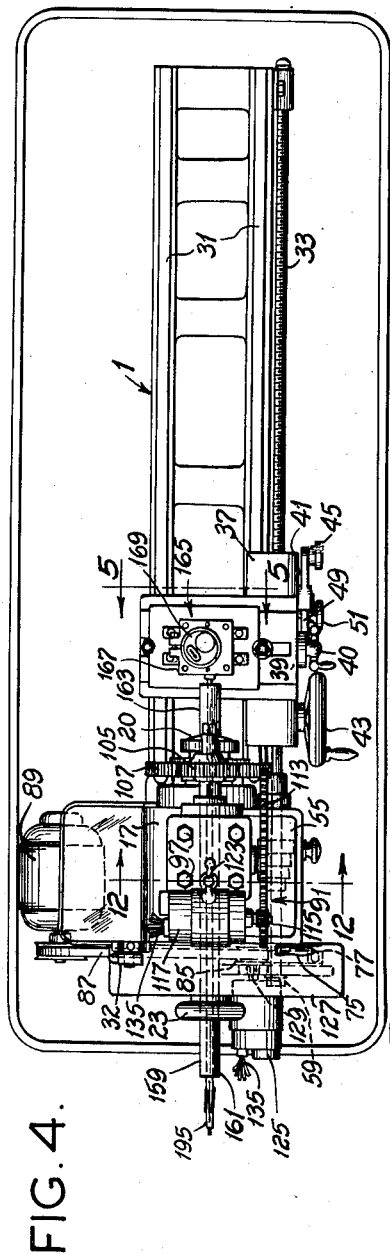
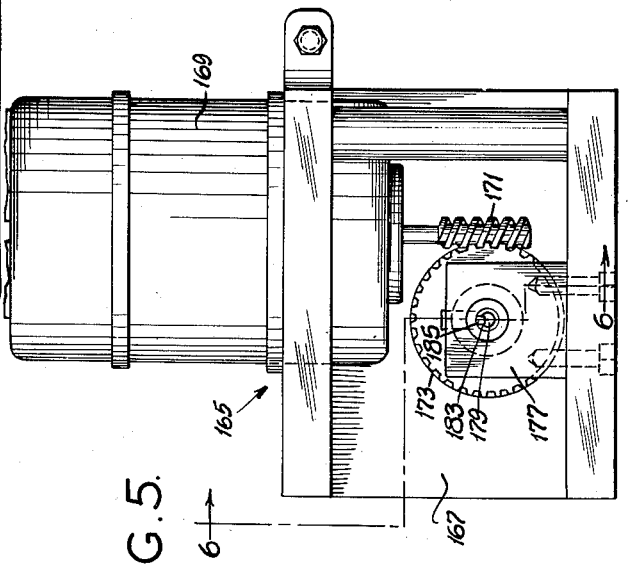
George E. Mallinckrodt,
Inventor.
Haynes and Koenig,
Attorneys.

Nov. 6, 1951 G. E. MALLINCKRODT 2,573,800
MACHINE TOOL
Filed Jan. 17, 1948 4 Sheets-Sheet 4
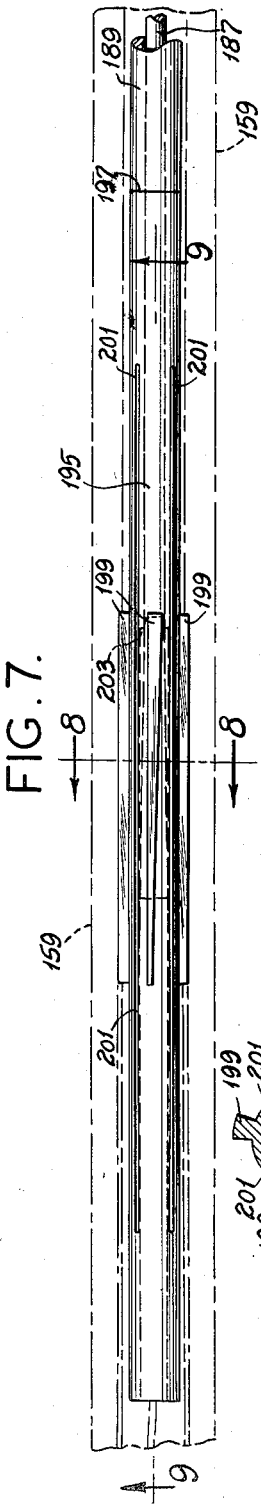
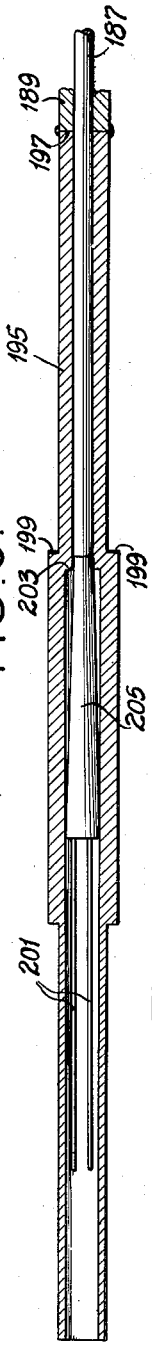
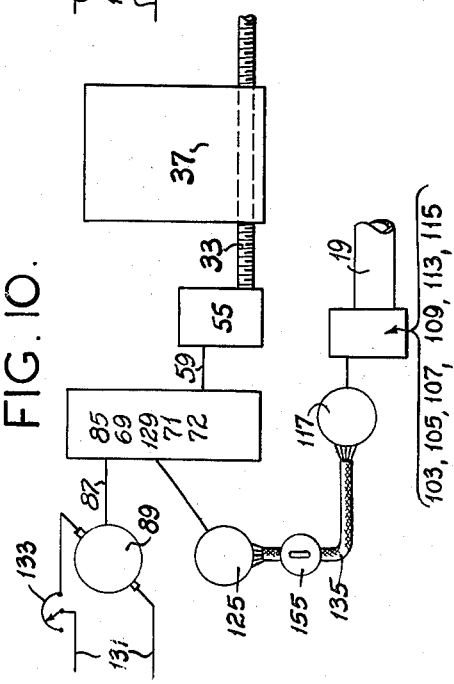
George E. Mallinckrodt
Inventor.
Haynes and Koenig
Attorneys.

Patented Nov. 6, 1951

2,573,800

UNITED STATES PATENT OFFICE 2,573,800

MACHINE TOOL

George E. Mallinckrodt, St. Louis, Mo.

Application January 17, 1948, Serial No. 2,858

14 Claims. (Cl. 90—33)

This invention relates generally to machine tools, and with regard to certain more specific features, to machine tools such as lathes incorporating related work-moving and work-cutting elements, one of which is rotary and the other translatory.

Among the several objects of the invention may be noted the provision of a machine tool in which a much wider range of relative velocities may be obtained between the work and tool-moving parts, whether translatory or rotary or both; the provision of apparatus of the class described in which said greater range of relative velocities may be obtained, regardless of which member (work mover or tool) is rotary; the provision of apparatus of the class described which is simple in form and economical to construct and which may readily be constructed as an attachment for greatly extending the range of use of existing machine tools, particularly lathes and the like. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a front elevation of a lathe embodying one form of the invention, parts being broken away for purposes of illustration;

Fig. 4 is a plan view of a lathe illustrating an alternative embodiment of the invention;

Fig. 5 is a vertical section on an enlarged scale, taken on line 5—5 of Fig. 4;

Fig. 6 is a vertical, jogged section, taken on line 6—6 of Fig. 5;

Fig. 7 is a detail plan view of an expanding broach;

Fig. 8 is a vertical section taken on line 8—8 of Fig. 7;

Fig. 9 is a longitudinal section taken on line 9—9 of Fig. 7;

Fig. 10 is a diagrammatic layout of the form of the invention shown in Figs. 1-3;

Fig. 11 is a diagrammatic layout of the form of the invention shown in Figs. 4-9; and, Fig. 12 is a detail section taken on line 12—12 of Fig. 4.

Similar reference characters indicate corresponding parts throughout the several views of the drawings.

Various machine tools rotate either a work piece or a tool while translating the other. A lathe is an example of such a machine tool wherein, as at present constructed, the work is turned at a substantial angular velocity relative to the translation of the cutting tool, the latter ordinarily moving at a relative low rate of speed. By means of selective gear trains, these ratios may be changed, but essentially in the case of a lathe the rate of tool translation is low with respect to the rate of work rotation. Hence it is impossible with an ordinary lathe to cut a thread of extremely high pitch. For example, two threads per inch is about the maximum that most lathes can cut. None will accommodate cuts that involve steep pitches such as, say, one turn in ten inches. Such cuts and even steeper ones are often useful in the manufacture of tools such as broaches, spiral reamers, twist drills, automatic screw drivers, rifles, etc. Furthermore, as to cross cuts, the cross-feed on an ordinary lathe is relatively slow with respect to the rate of angular rotating of the work, so that it is impossible to cut many desirable radially steep spiral or scroll shapes such as those used on scroll chucks, centrifugal pumps, spiral cams, etc. By means of the present invention an ordinary lathe may readily be converted to cut all of said shapes conveniently. If desired, the invention may be manufactured as an attachment for existing lathes.

The invention has further use in relating more complex relative movements, such as, for example, between three or more relatively movable parts in a machine tool, as will appear from the description hereinafter. It provides for relating such complex movements whether rotary or otherwise, in a simple manner requiring few complex or costly parts.

Figure 1:
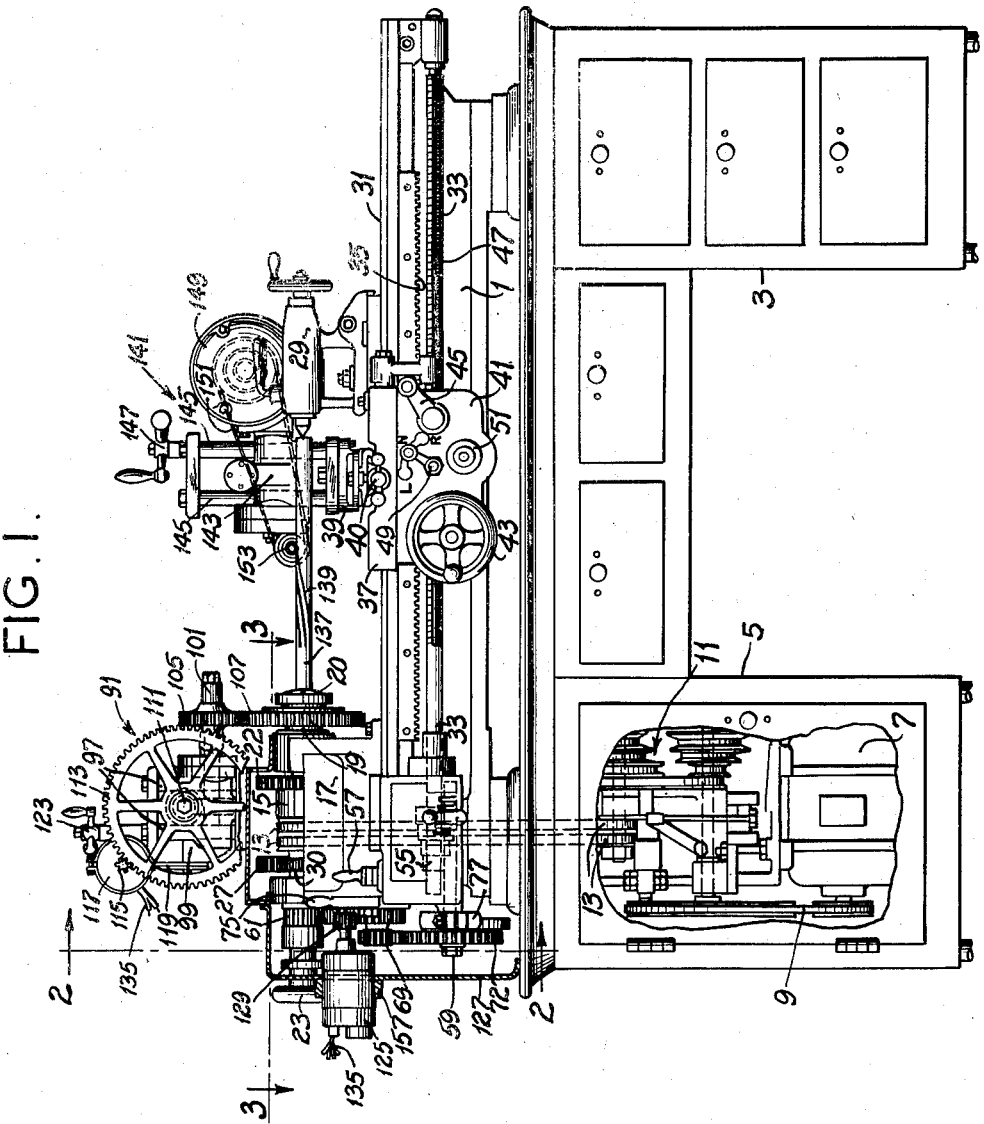
Figure 2:
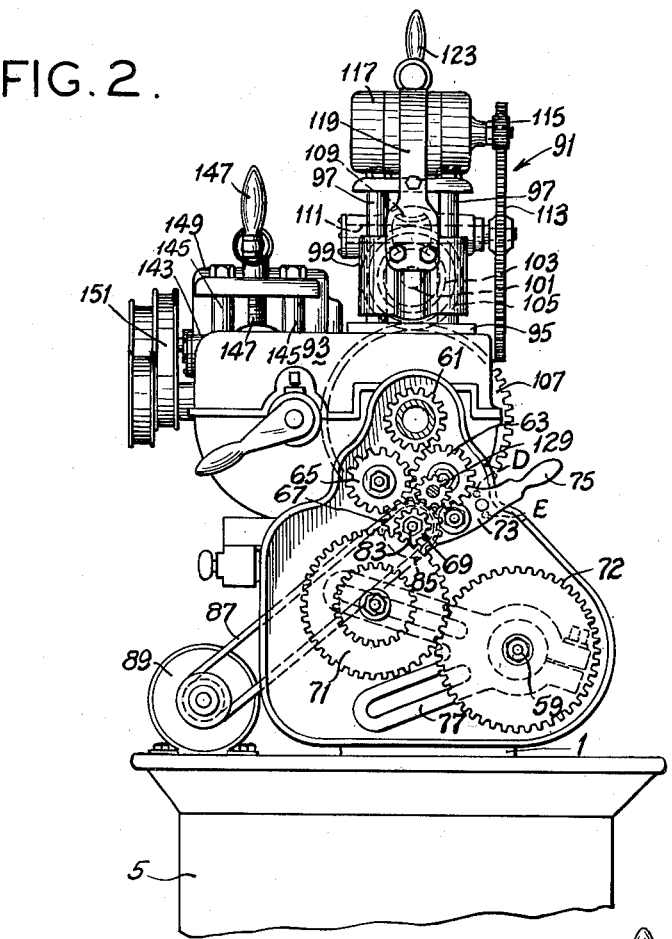
Fig. 2 is a cross section on an enlarged scale, being taken on line 2—2 of Fig. 1.
Figure 3:
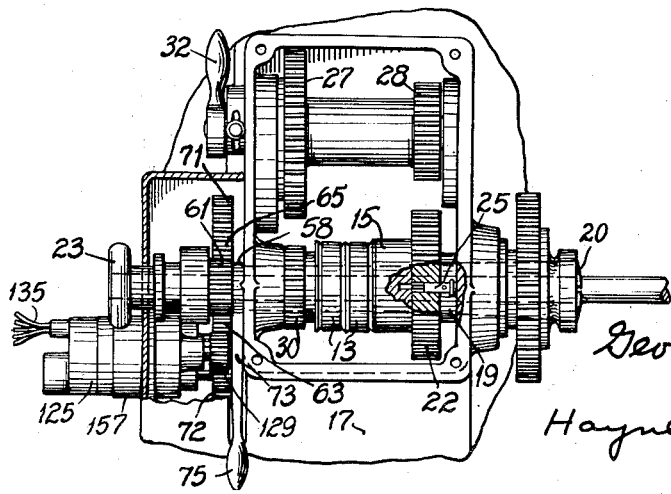
Fig. 3 is an enlarged detail section taken on line 3—3 of Fig. 1.
Figure 12:
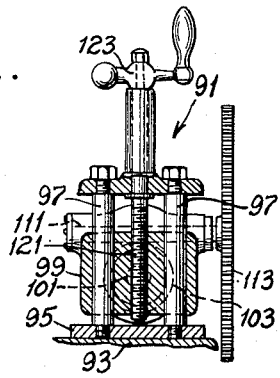

Referring now more particularly to Figs. 1-3 of the drawings, numeral 1 shows the bed of a lathe on supports 3 and 5. The support 5 is hollow and contains the usual driving motor 7 with V-belt drive 9 to a four-speed, V-belt, change-speed drive 11. A double V-belt drive 13 extends from this change-speed unit to the headstock pulley shown at 15 (Fig. 3).

The headstock is shown at 17. Rotary in the headstock is the live center spindle 19, which carries the chuck 20 for the work to be rotated. The chuck may be of the jaw type, or collet type shown. The collet chuck is controlled by a wheel 23 is the usual way, which requires no further detailed description, being known.

As shown in Fig. 3, the spindle 19 carries a gear 22 and a direct connection may be made between the headstock pulley 15 and the live center spindle 19 through the usual manually releasable dog 25 connecting gear 22 with pulley 15. Or, the usual connectible back gear cluster 27, 28 may be employed when the dog is released to drive the live spindle at reduced speed. In this event gear 27 engages a gear 30 on the pulley 15 and gear 28 meshes with gear 22. The gear cluster 27, 28 is eccentrically mounted as usual and under control of a handle 32 for effecting engagement and disengagement.

At 29 is shown the dead center support which is slidable on the usual lathe guides 31 of bed 1.

The lathe also carries the usual slotted lead screw 33 and also a rack 35, both positioned on the bed. The tool carriage is shown at 37 and sides on the guides 31. It includes the tool support 39, which is controlled in the usual way from a cross-feed screw control 40. The apron front of the carriage is shown at 41 and includes the hand-feed wheel 43. This apron also includes the split nut (not shown) under control of a lever 45 by means of which the carriage may be coupled and uncoupled to the lead screw, as desired, for automatic feed.

The lead screw is splined at 47. The apron 41 includes a common gear train (not shown) which, through the spline, may be driven by the lead screw when the split nut connection to the lead screw is not used. This train has a final gear meshing with the rack 35. On the apron is a lever 49 which, when thrown from the neutral position N to the right-hand position R, connects this train, provided a clutch is closed which is operated from a control wheel 51 on the apron 41. This provides for slow carriage movement. When the lever 49 is thrown to its left-hand position L, this train is coupled to the cross-feed screw of the tool carriage.

The lead screw is driven through the usual selector change-speed gear box 55. The selector shaft lever is shown at 57.

As shown in Fig. 3, the pulley 15 is on a shaft 58. The input shaft 59 of the box 55 is driven from the shaft 58 through a gear train 61, 63, 65, 67, 69, 71 and 72; or 61, 65, 67, 69, 71 and 72. Gears 63 and 65 are always in mesh but selectively mesh with gear 61. Gear 65 is always in mesh with gear 67 but 63 does not mesh with 67. The gears 63, 65 and 67 are on the usual reverse-gear control spider 73, controllable from the reverse-gear handle 75. Spider 73 is centered on shaft 83 of gear 67. When the spider is set into a neutral position, the gears 63 and 65 are disconnected from gear 61 (as shown in Fig. 2), so that the lead screw is not driven. The lead screw is driven in one direction when spider 73 is set in one position D and is reversed when this lever 75 is set in its other position E, as will be clear from the above.

In Fig. 2, the gears 71 and 72 are shown as being on a spider 77. If desired, other gears may be substituted on spider 77 to give an additional speed selection to screw 33.

The above constitutes the common parts of ordinary lathes to which, for example, the invention applies, and need not be further detailed for those skilled in the machine tool art.

In order to carry out the present invention, in one form, the shaft 83 of gear 67 is provided with a pulley 85 which is driven by means of a belt 87 from an auxiliary motor 89. Thus the gear 67 may be driven independently of the usual driving motor 7 of the lathe when the control spider 73 is at neutral; which means that both gears 63 and 65 are out of engagement with the gear 61. It follows that the lead screw 33 may be rotated from motor 89 independently of motor 7, the drive being through gears 69, 71, 72, gear box 55 to the lead screw 33.

In order to drive the spindle 19 (dog 25 being set to disconnect the gear 22 from the pulley 15 as in Fig. 3), a drive assembly indicated generically at 91 is used. This drive is mounted upon the cover 93 of the headstock and comprises a bedplate 95 bolted to said cover. Extending from the plate 95 are four vertical guide posts 97. Sliding vertically on these guide posts is a crosshead 99, which forms a bearing for a shaft 101, the latter carrying worm gear 103. This shaft 101 also carries a pinion 105, meshing with a gear 107 attached to the spindle 19. The worm gear 103 meshes with a worm 109 carried upon a shaft 111 borne in said crosshead 99. On the shaft 111 is a large gear 113, which meshes with a pinion 115 of a self-starting selsyn type of synchronous motor 117, the latter being supported by a bracket 119 carried upon the crosshead 99. The crosshead 99 (and parts supported thereby) may be raised and lowered by means of a screw 121 under control of a handle 123. Raising the crosshead has the effect of disengaging gears 105 and 107, as may be desired, to permit operating the lathe in the usual manner from motor 7. Lowering the cross head engages these gears 105 and 107 for special operations to be described, in which event motor 89 is used.

It will be seen that by rotating the synchronous motor 117 it will drive the spindle 19 via gear train 115, 113, 109, 103, 105 and 107. The speed reduction between motor 117 and that of the spindle is substantially high, being of the order of 300:1 in the present example.

The motor 117 is supplied with current from a synchronous generator 125, the latter being mounted upon a support 127 and having a driving pinion 129 which meshes with the gear 67. The motor 117 may have its direction of rotation reversed relative to that of the generator 125 by rearranging the leads between them.

The diagram of Fig. 10 illustrates the basic relationship between the parts above described. The supply line circuit 131 supplies the motor 89 through a rheostat 133 for over-all speed-control purposes. The synchronous generator 125 is suitably wired to the synchronous motor 117 in the usual way for such equipment, so that the motor will electrically follow the generator in rotary synchronism. The wire connections are in a cable shown at 135, provided with a cut-off switch 155.

From Fig. 10 it will be seen that the motor 89 when energized will drive the synchronous generator 125 through the mechanical train 87, 85, 69, and 129. This mechanical train also drives the lead screw 33 via 71, 72, 59, and 55. Thus the carriage 37 is translated at a rate proportional to the revolutions of the motor 89 and synchronous generator 125. The synchronous motor 117 electrically follows the synchronous generator 125 and drives the spindle 19 through the mechanical train 115, 113, 109, 103, 105 and 107. Since there is a large step-down in speed through this train from the synchronous motor 117 to the spindle 19, the latter has a very low angular velocity. Besides, the mechanical advantage of the motor 117 relative to the spindle 19 is so great that with any ordinary resistance encountered on spindle 19 the motor 117 cannot pull out of synchronism from the synchronous generator 125. As a result also, the angular lag between the motor 117 and generator 125 is small. In view of the large speed reduction between the motor 117 to the spindle 19, actual lag between the movement of the spindle 19 and movement of the carriage 37 is, even under accelerating conditions, of an extremely low order. Under steady running conditions it becomes practically nil. Complete phase pull-out cannot occur at all.

A typical advantageous application of the invention is to fluting, and such an operation is illustrated in Fig. 1. In this case the work piece shown at 137 is held between the dead center 29 and the collet chuck 20. In order to grind the flutes shown at 139, a grinder mechanism indicated at 141 is placed upon the tool support 39. This mechanism includes assembly 143 adapted to be adjusted up and down on posts 145 by means of a screw mechanism 147. Assembly 143 includes a motor 149 which, through a belt drive 151, rotates a grinding wheel 153. By adjusting the cross-feed control 40 and the screw 147, the grinding wheel may be properly related to the work piece 137. By energizing the motor 89, the carriage 37 is caused automatically to traverse the guides 31. The rate of motion is substantial, all of it being through standard mechanical lathe drive parts except that the motion originates at the motor 89 instead of the motor 7, the latter being turned off. At the same time, the work piece 137 is very slowly rotated by reason of rotation of synchronous following motor 117, which drives the piece through the mechanism 91, said motor 117 following the synchronous generator 125.

In view of the above, it will be seen that an extremely slow rotation can be obtained for the work piece 137 without incorporating in the lathe mechanism itself any gear trains, which would be expensive by reason of the complication that would inhere in organizing them with the rather complex trains already existing in lathes. In addition, the gear-reduction mechanism 91 that is employed is in the nature of an attachment which is easily connectible and disconnectible by connection and disconnection of the gear 105 by operation of 123.

An important point is that the great speed reduction between synchronous motor 117 and the work piece 137 not only provides for an extremely low angular velocity for the work piece, but prevents phase pull-out between the movements of the synchronous motor 117 and the synchronous generator 125.

To adapt an ordinary lathe to extremely slow spindle speed relative to carriage speed would be much more complex and costly than the use of the invention described.

For fast operation of the carriage 37 without cross-feed operation, the lever 49 would be set to position R, which causes the carriage to be driven from the spline 47 in the lead screw 33 and by reaction with respect to the rack 35. If it were desired to cut volute outlines in, for example, a disc driven by the live center, the carriage 37 would be released from the lead screw 33 by operating lever 45 and then setting lever 49 into the position L in order to operate the cross-feed screw of the tool carriage.

If at any time it is desired to use the lathe in the ordinary way, it is only necessary to operate the handle 123 to lift the gear 105 out of mesh with gear 107. Then by electrically deenergizing motor 89, the lathe may be used as usual. Under these circumstances it is desirable to open the circuit between the generator 125 and motor 117, which may be done at switch 155. This prevents movements in the disconnected organization 91. Or, if desired, the pinion 129 may be unmeshed by physically retracting the synchronous generator 125 in its support 157. For ordinary lathe operation the motor 7 is energized, the operations being as usual and requiring no further description.

The invention also has further applications illustrated in Figs. 4–11. In this embodiment of the invention a lathe is employed for broaching helical rifling in a gun barrel, shown at 159. This is to be accomplished with an expanding broach so as to produce a choke effect in the barrel. In this embodiment, the same reference characters as used above indicate corresponding parts, and additional ones will receive higher numbers. The problem in this case is to draw the broach through the barrel 159, which is held in the collet chuck 20, and extends through the usual hollow portions within the gear 22, pulley 15, shaft 53, wheel 23, etc. In this case the muzzle of the barrel is indicated at 161 and the breech at 163.

Mounted upon the carriage 37 is a mechanism which is identified generally by the numeral 165 and is shown in Figs. 4–9 and 11. This comprises a support 167 bolted to the tool support 39 on the carriage 37. On the support is a second synchronous motor 169, wired to the synchronous generator 125, as indicated in Fig. 11. This motor drives a worm 171 which is meshed with a worm gear 173. The latter is carried between two stops 175 and 177, forming part of the support 167. The worm gear 173 is internally threaded over a screw 179, the latter being slidable in bushings 181. To prevent the rotation of the screw 179, it is slotted as shown at 183. A pin 185 in the groove allows axial movement of the screw 179 without rotation. Thus upon rotation of the gear 173 the screw may be moved axially.

Attached to and extending from the screw 179 is a pull rod 187, which passes through a tube 189, the base 191 of which is held to support 175 by means of a set screw 193. To the outer end of the tube 189 is welded a hollow, expansible broach 195, shown more particularly in Figs. 7–9. The welding is shown at 197. It is the purpose to draw this broach through the slowly rotating gun barrel 159 while retracting the carriage 37. At the same time, it is desired to expand the broach a few thousandths of an inch as it performs its broaching action in traversing the length of the barrel. The broach is tubular in form, as indicated, and includes steeply helical cutting teeth 199 with intermediate slots 201 for expansibility (Fig. 8). An inner shoulder 203 is provided near the leading edges of the teeth 199. The outer end of the pull rod 187 is provided with a conical expanding wedge 205 adjacent the shoulder 203. This constitutes a tool manipulator. It will be seen that if the pull rod 187 is moved or retracted to the right relatively to the broach 195, the wedge 205 will contact shoulder 203 and manipulate it to expand the leading edges of the cutting teeth 199. If this action is accomplished as the broach traverses the gun barrel, the broach will gradually expand as it moves away from the muzzle 161 and approaches the breech 163 of the barrel 159. Both the rotation of the barrel and linear movement of the expander 205, relative to the linear motion of the broach, must be extremely slow.

In Fig. 11 is a diagram like Fig. 10, except that the additional parts have been added corresponding to the additional parts shown in Figs. 4–9 of the alternative embodiment of the invention. As will be seen, the synchronous motor 169 in this case follows synchronous generator 125, in addition to the synchronous motor 117 following said synchronous generator 125. Operation of this alternative form of the invention is as follows, assuming that gears 105 and 107 are meshed and that motor 89 is running, motor 7 being dead and dog 25 being released:

The collet chuck 20, which carries the gun barrel 159, rotates very slowly because of its drive from the synchronous motor 117. The carriage 37 advances to the right (Fig. 4), carrying with it the parts shown in Figs. 5 and 6. The broach 195 starts at the muzzle 161 of the barrel 159, as shown in Fig. 4. It does not rotate. The carriage draws this broach through the barrel as the barrel slowly rotates. Since the synchronous motor 169 is being driven from the generator 125, it turns the worm wheel 173 to draw in the screw 179, which through pull rod 187 draws in the wedge 205. This occurs at a relatively low rate of speed. The velocity of the wedge 205 relative to the shoulder 203 is such that the entire maximum desired expansion of the broach (a few thousandths of an inch for example) occurs during the interval that it takes for the broach to travel throughout the length of the gun barrel.

In view of the above, it will be seen that a relatively small number of simple parts is required for the rather complicated coordination necessary for performing the stated broaching operation. It will also be seen that, if desired, any number of other coordinating operations could be performed on a machine tool by adding suitable synchronous motors to follow a master synchronous generator such as generator 125. It is necessary, however, that each synchronous following motor have a substantial enough mechanical speed-reducing mechanism between it and the item which it is to control, so that the resistance afforded by such controlled item cannot cause the motor to pull out of synchronism or even to lag by an undesirable amount, taking into consideration the requirements of the work.

It will be understood that, if desired, the belt drive 87 instead of being powered from a separate motor such as 89 may be powered from the main driving motor 7 of the lathe. In such event the drive 9 or 11 needs to be disconnected when the apparatus of the present invention is operative.

The invention has many other applications which will be clear from the above, such as, for example, to milling machines, shapers, planers, boring mills etc.

As has been made clear from the above, the synchronous motors such as 117 and 169 are of the self-starting type. This is important, since in a machine tool it is not feasible to give a preliminary rotation to parts in order to effect synchronization. Thus it is important that these motors be of the self-starting, synchronous type, which means that they not only synchronize with the generator 125 during motion but that they will start and stop therewith.

An important aspect of the invention is that the connections between any generator such as 125 and any motor such as 117 or 169 are flexible and non-rigid, making feasible the use of the device as an attachment. Also, reversal of relative rotations is easily accomplished by reversing connections between motors and generators.

It will also be seen that many of the advantages of the invention could be obtained by a non-rigid, flexible mechanical drive, such as a flexible chain or flexible shaft drive between the gears 129 and 115 (Fig. 1), or between 129 and 171 (Figs. 4 and 5). In such a case if reversal of rotation were needed, a small reversing gear box would be used in association with the flexible shaft drive. By employing a gear-reduction unit such as 91 or 171—173, not only is the movement of the driven piece slowed down, but the mechanical advantage provided for minimizes any tendency for non-rigid driving connections between gears 129 and 115 from introducing any substantial out-of-synchronism.

Another feature of the invention is that, if desired, the motion of the generator 125 may be taken from a moving system which is extraneous to the lathe itself. For example, the generator 125 of Fig. 1, instead of being connected to the gear train of the lathe thereon shown, may conveniently be connected to an operating gear train of some other machine tool in a shop. Thus advantage may be taken of any source of movement conveniently available for operating the generator. This considerably enhances the value of the device as an attachment.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. For a lathe having a live center, a reversible and disconnectible gear drive therefor and a tool carriage driven from said drive; a synchronous generator driven by said drive, a gear train for driving the live center when said gear drive is disconnected from the live center, and a self-starting synchronous motor driving said gear train and electrically energized from said synchronous generator.

2. For a lathe having a live center, a reversible and disconnectible gear drive therefor and a tool carriage driven from said drive; a synchronous generator driven by said drive, a gear train for driving the live center when said gear drive is disconnected from the live center, a self-starting synchronous motor driving said gear train and electrically energized from said synchronous generator, and apparatus for quickly disconnecting said gear train in respect to the live center, whereby said gear drive may be independently reconnected with the live center.

3. For a lathe having a live center, a tool carriage, and a gear drive to the carriage and live center, said gear drive including a disconnectible reverse-gear set for the live center and operative around a non-reversing pinion; attachments comprising a synchronous generator driven from said non-reversing pinion, a self-starting synchronous motor adapted electrically to follow said synchronous generator, a velocity step-down gear train between the synchronous motor and the live center, the attachments being adapted for quickly disconnecting said gear train from the live center to accommodate forward or reverse reconnection of said gear set thereto.

4. For a lathe having a tool carriage operated by a lead screw driven from a gear drive reversibly connected to its live center; apparatus comprising a synchronous generator connected with said gear drive, an assembly consisting in a gear train connected with the live center, and a self-starting motor driving said gear train and electrically connected with said synchronous generator.

5. For a lathe having a tool carriage operated by a lead screw driven from a gear drive reversibly connected to its live center; a coordinated attachment comprising a synchronous generator connected with said gear drive, an assembly on the lathe consisting in a gear train connectible and disconnectible with the live center, and a self-starting motor driving said gear train and electrically connected with said synchronous generator.

6. For a lathe having a carriage, a live center and an operable gear drive between the carriage and the live center; a cutting attachment comprising a synchronous generator coupled to said drive and coordinated with carriage movements, a first self-starting synchronous motor, a speed-reducing gear train between said first synchronous motor and the live center, an expansible cutter movable with the carriage, a retractive expander for the cutter and located on the carriage, a second self-starting synchronous motor supported on the carriage, a speed-reducing mechanism between said second synchronous motor and said retractive expander for moving the expander relatively to the carriage and the cutter, both of said synchronous motors being electrically synchronized with said generator.

7. Internal broaching apparatus comprising a support for a work piece having an opening to be broached, a carriage movable relatively to the opening, an expansible broach comprising a member movable through said opening, an axially movable expander operatively connected with the broach, a support for the broach shiftable by the carriage but non-shiftable relative thereto, an axially movable control member for the expander and an operative shift element therefor on the carriage which is movable relatively to the carriage in proportion to the movement of the carriage relative to the work piece.

8. Internal broaching apparatus comprising a support for a work piece having an opening to be broached, a carriage movable relatively to the opening, an expansible broach comprising a tubular element movable through said opening, said tubular element having relieving slots and exterior teeth adjacent the slots, an axially movable expander within the tubular element, an interior portion of the tubular element adjacent the teeth and slots being engageable with said expander, a tubular support for the tubular element and extending to the carriage and being rigidly mounted thereon, an axially movable control rod for the expander and extending through said tubular support to the carriage, and a shift element therefor on the carriage which is movable relatively to the carriage in proportion to the movement of the carriage relative to the work piece.

9. Internal broaching apparatus comprising a rotary support for a work piece having an opening to be broached, a carriage movable relatively to the opening in an axial direction relative to the rotation of the work piece, an expansible broach comprising a non-rotary tubular element axially movable through said opening, said tubular element having relieving slots and exterior teeth adjacent the slots, a non-rotary and axially movable expander within the tubular element, an interior portion of the tubular element adjacent the teeth and slots being engageable with said expander, a tubular support for the tubular element and extending to the carriage and being rigidly mounted thereon, a non-rotary axially movable control rod for the expander and extending through said tubular support to the carriage, and a shift element therefor on the carriage which is axially movable relatively to the carriage in proportion to the axial movement of the carriage relative to the work piece.

10. A lathe comprising a power unit, a rotary work holder and a translating tool holder, a mechanical drive between said power unit and the tool holder, a synchronous generator movably coordinated with said mechanical drive and being driven by said power unit, a second mechanical drive for said rotary work holder, and a self-starting synchronous motor operating said second mechanical drive and electrically energized from said synchronous generator.

11. A lathe made according to claim 10, wherein said mechanical drive provides for a substantial speed reduction at a substantial mechanical advantage between the synchronous motor and the rotary work holder which it drives sufficient to prevent said synchronous motor from being pulled substantially out of phase with respect to said synchronous generator.

12. A lathe comprising a power unit, a rotary work holder, a translating tool holder and a translating tool manipulator, a mechanical drive between said power unit and the rotary tool holder, a synchronous generator coordinated with said mechanical drive and driven from said power unit, a second mechanical drive for the translating tool holder, a third mechanical drive for the translating tool manipulator, and individual self-starting synchronous motors respectively operating the mechanical drives to the tool holder and the tool manipulator, both of said synchronous motors being electrically energized from said synchronous generator.

13. An attachment for a lathe having a headstock including a rotary live spindle, said lathe having a tool holder and a lead screw for driving the same, the lead screw including a driving gear train therefor; comprising a gear on the rotary spindle, a quick-detachable gear-reduction unit adapted to be applied to and removed from said headstock and including a gear for meshing application to said gear on the spindle, a synchronous motor incorporated with said gear-reduction unit adapted to drive the same, means for driving the gear train for the lead screw, a synchronous generator mechanically connected to be driven with said gear train of the lead screw, said generator being electrically connected to supply current to said motor.

14. In a lathe having a rotary live spindle, a tool carriage, a lead screw for driving said tool carriage and a gear train for driving said lead screw; means on the spindle for holding a part to be broached, means on the carriage for moving an expandible broach therewith axially with respect to the part to be broached, means on the carriage for axially effecting movement of a broach expander relatively to the movement of the broach and the carriage and adapted to expand the broach in proportion to said last-named relative movement, means for driving the lead screw through its gear train, a synchronous generator connected for movement proportionately to movement of the gear train, and two synchronous motors energized from said synchronous generator, one of said synchronous motors being adapted to drive said rotary spindle, and the other of said synchronous motors being mounted upon said carriage and connected to said expander for movement thereof relatively to movement of the carriage and the broach.

GEORGE E. MALLINCKRODT.

REFERENCES CITED

The following references are of record in the file of this patent:

UNITED STATES PATENTS

| Number | Name | Date |
|---|---|---|
| 141,091 | Stephens | July 22, 1873 |
| 1,234,170 | Johnson | July 24, 1917 |
| 1,319,482 | Mayoh | Oct. 21, 1919 |
| 1,749,633 | Forberg | Mar. 4, 1930 |
| 2,317,522 | Curtis | Apr. 27, 1943 |
| 2,359,255 | Smith | Sept. 26, 1944 |
| 2,377,627 | Hallberg et al. | June 5, 1945 |